United States Patent
Levingston (10) Patent No.: US 7,726,872 B2
(45) Date of Patent: Jun. 1, 2010

(54) BALANCE WHEEL, BALANCE SPRING AND OTHER COMPONENTS AND ASSEMBLIES FOR A MECHANICAL OSCILLATOR SYSTEM AND METHODS OF MANUFACTURE

(76) Inventor: Gideon Levingston, 50 Avenue Francis de Croisset, F-06130 Grasse (FR)

( * ) Notice: Subject to any disclaimer, the term of this patent is extended or adjusted under 35 U.S.C. 154(b) by 234 days.

(21) Appl. No.: 10/576,572

(22) PCT Filed: Sep. 17, 2004

(86) PCT No.: PCT/GB2004/004012

§ 371 (c)(1),
(2), (4) Date: Jan. 29, 2007

(87) PCT Pub. No.: WO2005/040943

PCT Pub. Date: May 6, 2005

(65) Prior Publication Data

US 2007/0140065 A1 Jun. 21, 2007

(30) Foreign Application Priority Data

Oct. 20, 2003 (GB) .................................. 0324439.9

(51) Int. Cl.
*G04B 17/04* (2006.01)

(52) U.S. Cl. ..................................................... 368/175
(58) Field of Classification Search ................ 368/139, 368/140, 168–178, 124, 127, 158, 161
See application file for complete search history.

(56) References Cited

U.S. PATENT DOCUMENTS 209,642 A 11/1878 Berlitz (Continued)

FOREIGN PATENT DOCUMENTS

CH 34141 3/1906

(Continued)

OTHER PUBLICATIONS

Randall, Anthony, Glass Balance Springs—Part 1, 1951, pp. 135-137, vol. III, Bulletin de la Societe Suisse de Chronometrie.

(Continued)

*Primary Examiner*—Edwin A. Leon
(74) *Attorney, Agent, or Firm*—Stites & Harbison PLLC; Douglas E. Jackson (57) ABSTRACT

The application discloses a method of making a balance spring (100) from continuous fibers or ceramic by winding them around a cylindrical former (90), interspaced with a releasing agent (110). Also disclosed is a method of making a balance spring, preferably of a ceramic material (60), by applying it to a rotating former (70) mandrel or plate and subsequently heat treating. Balance wheels (30) having a moment of inertia which decreases with a rise in temperature due to a special arrangement of components (8, 9, 10) having different coefficients of thermal expansion are also disclosed. A mechanical oscillator system comprising a non-magnetic ceramic or continuous fiber balance spring (50) and a non-magnetic balance wheel (30) formed of a material having a coefficient of thermal expansion of less than $6\times10^{-6}K^{-1}$ and having a plurality of non-magnetic poising or timing appendages (5) is also disclosed.

16 Claims, 6 Drawing Sheets

U.S. PATENT DOCUMENTS

| | | | |
|---|---|---|---|
| 455,787 A | 7/1891 | Bilgram | |
| 1,974,695 A | 9/1934 | Strauman | |
| 2,184,668 A * | 12/1939 | Hansen et al. | 368/184 |
| 2,568,326 A | 9/1951 | Dubois | |
| 2,936,572 A * | 5/1960 | Biemiller et al. | 368/171 |
| 3,028,511 A * | 4/1962 | Beyner | 310/36 |
| 3,187,416 A | 6/1965 | Tuetey et al. | |
| 3,547,713 A | 12/1970 | Steinemann et al. | |
| 3,548,586 A * | 12/1970 | Klinck | 368/169 |
| 3,624,883 A | 12/1971 | Baehni | |
| 3,683,616 A | 8/1972 | Steinemann et al. | |
| 3,735,971 A | 5/1973 | Steinemann | |
| 3,773,570 A | 11/1973 | Steinemann et al. | |
| 3,780,521 A * | 12/1973 | Kurita et al. | 368/163 |
| 3,813,872 A | 6/1974 | Nakagawa et al. | |
| 4,147,568 A * | 4/1979 | Marechal | 148/419 |
| 4,260,143 A | 4/1981 | Kliger | |
| 4,765,602 A | 8/1988 | Roeseler | |
| 5,043,117 A | 8/1991 | Adachi et al. | |
| 5,678,809 A | 10/1997 | Nakagawa et al. | |
| 5,881,026 A * | 3/1999 | Baur et al. | 368/169 |
| 5,907,524 A | 5/1999 | Marmy et al. | |
| 6,329,066 B1 | 12/2001 | Baur et al. | |
| 6,357,733 B1 | 3/2002 | Wulz et al. | |
| 6,705,601 B2 | 5/2004 | Baur et al. | |
| 2002/0070203 A1 | 6/2002 | Serex | |
| 2002/0167865 A1* | 11/2002 | Tokoro et al. | 368/175 |
| 2007/0140065 A1 | 6/2007 | Levingston | |

FOREIGN PATENT DOCUMENTS

| | | |
|---|---|---|
| DE | 19651320 | 6/1998 |
| DE | 19651321 | 6/1998 |
| DE | 19651322 | 6/1998 |
| EP | 0 393 226 | 10/1990 |
| EP | 0 732 635 | 9/1996 |
| EP | 1 039 352 | 9/2000 |
| EP | 1 256 854 | 11/2002 |
| EP | 1 302 821 | 4/2003 |
| EP | 1 351 103 | 10/2003 |
| EP | 1 422 436 | 5/2004 |
| EP | 1 445 670 | 8/2004 |
| EP | 1515200 | 3/2005 |
| FR | 2136084 | 12/1972 |
| GB | 1180762 | 2/1970 |
| GB | 2 041 152 | 9/1980 |
| GB | 2416408 | 6/2006 |
| JP | 1006537 | 1/1989 |
| JP | 1110906 | 4/1989 |
| JP | 1110907 | 4/1989 |
| JP | 1110908 | 4/1989 |
| JP | 1110909 | 4/1989 |
| JP | 07138067 | 5/1995 |
| JP | 09257069 | 9/1997 |
| JP | 11147769 | 6/1999 |
| WO | WO 96/14519 | 5/1996 |
| WO | WO 01/01204 | 1/2001 |
| WO | WO 2004/008259 | 1/2004 |
| WO | WO 2005/017631 | 2/2005 |

OTHER PUBLICATIONS

Stephen, Richard, Carbon Fibre Pendulum Rods, Feb. 2000, Horological Journal.

Edwards, Evan, Carbon Fibre Rods for Pendulums, Jun. 2000, Horological Journal.

Glass Balance Springs—Part 2, 1952, pp. 246-249, vol. III, Ibid.

Guillaume, Charles-E., Invar and elinvar, Nobel Lecture, Dec. 11, 1920.

XP-002313758, Spiral (Multi-language encyclopedic? article on spiral spring).

* cited by examiner

BALANCE WHEEL, BALANCE SPRING AND OTHER COMPONENTS AND ASSEMBLIES FOR A MECHANICAL OSCILLATOR SYSTEM AND METHODS OF MANUFACTURE

TECHNICAL FIELD

The present invention relates to a balance wheel for use in precision horological timekeeping mechanical oscillator systems, or in other precision instruments. It is thought that it will be particularly applicable to the oscillator system in a mechanical watch although the present invention is not limited to this.

TECHNICAL BACKGROUND

Balance wheels for watches have previously been principally made of metal. A balance spring is arranged to oscillate the balance wheel and to do so with a period of oscillation that should be isochronous.

The metals used have generally high linear expansion coefficients as compared to most ceramics. This has been the norm for example in the systems containing a balance wheel made of metal (Fe—Ni, Cu—Be, Cu—Zn, Cu—Au, Ni or combinations of these) and the balance spring made from an Fe—Ni alloy, or Fe—Mn—C or other steel derivative alloys. The applicant's earlier application PCT/GB03/003000 filed on 10 Jul. 2003 and published 22 Jan. 2004 and hereby incorporated by reference, discloses new balance spring materials to enable the thermal and magnetic influences in this relationship to be improved or overcome, and thus greater precision to be reached.

The effects of thermal influences upon the balance wheel and the balance spring are not the same. The thermal and thermoelastic characteristics within the relationship between the balance wheel and balance spring do not evolve in an identical manner.

The most successful previous attempts (C. E. Guillaume's bimetallic compensating balance wheel and steel balance spring system invented 1912, Hamilton's precision ferronickel based spring alloy in conjunction with steel and invar ovalising balance wheel invented 1943) to bring the terms of the associating relationship into constancy have required the use of materials which despite their useful thermal characteristics (the ferro-nickel alloys have an abnormal Young's modulus evolution) are sensitive to magnetism. This latter influence disturbs the Young's modulus stability and causes negative effects to the precision (isochronism) of the timekeeper.

The expression for the period of oscillation T is described as follows:

$$T = 2\pi\sqrt{\frac{I}{G}} \quad [1]$$

T: the period of oscillation, I: the moment of inertia of the balance wheel, G: the torque of the balance spring.

The oscillator system is subject to variations of magnetic and thermal nature. When a balance wheel is made of metal it expands with an increase in temperature. The balance spring that is made most generally of a ferro-nickel alloy also expands with an increase in temperature.

The rate of linear expansion is measured in units of 1/1000 of millimetres/degree Kelvin, represented for example in the case of copper, Cu, as $+17 \times 10^{-6} K^{-1}$ and is known as the $\alpha$ coefficient.

The thermoelastic coefficient describes the tendency of change in elasticity of the material for a rise in temperature.

Figure 1:
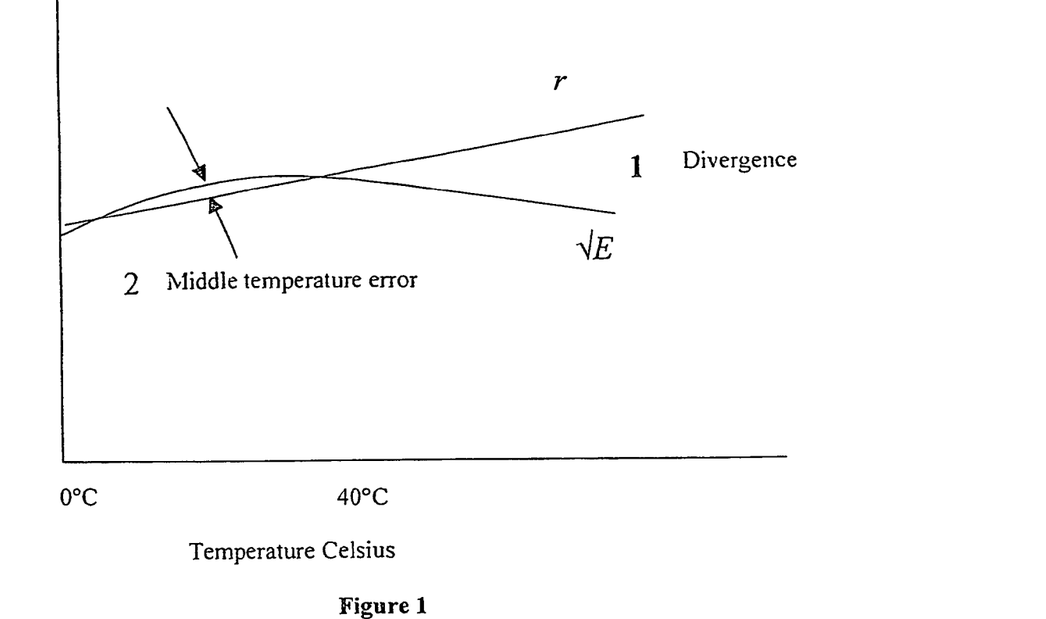
FIG. 1 is a graph showing the variance of the balance wheel radius r and the square root of the balance spring's modulus of elasticity $\sqrt{E}$ with temperature for a conventional metal balance wheel and ferro-nickel alloy balance spring as has been described above.

The ferro-nickel alloy has a positive thermoelastic coefficient which is described as 'abnormal', up to 40° C. when fully de-magnetised. Magnetic accumulation however lowers this threshold which causes the divergence of terms E and r at lower temperature as shown in the graph of FIG. 1 depicting variance of r (radius of gyration of the balance wheel) and $\sqrt{E}$ (square root of the modulus of elasticity of the balance spring) with temperature. This is the cause of the resultant error in the isochronism of the oscillator.

Whereas the balance wheel is in general only affected by thermal variations, which affect its physical dimensions, the balance spring is affected by both thermal and magnetic variations, which affect both its physical dimensions, and its elasticity (Young's modulus).

SUMMARY OF THE INVENTION

For the improved performance of the timekeeper these negative effects must be eliminated or reduced to a minimum. The inventor has noticed that the Young's modulus of balance springs and the Fe—Ni balance spring in particular are affected by temperature and magnetism, and that the magnetic accumulation in the spring has a detrimental effect on timekeeping. The inventor has noticed that these changes in the spring account for the major part (75%) of oscillator error; much of the remaining error is due to thermally induced changes in the balance wheel.

Aspects of the present invention are defined in the appended claims. A discussion of the theory behind the invention, preferred features and other aspects of the invention now follows.

The variables contained within relationship [1] are expressed:

$$T = 2\pi\sqrt{\frac{12.M.r^2.l}{E.h.e^3}} \quad [2]$$

Temperature and magnetic variations influence T (the period of oscillation) resulting from the effects of expansion and contraction of the balance spring and balance wheel and the changes in elasticity of the spring material.

The torque of the balance spring is a function of its dimensions: length l, height h, thickness e, and of its Young's Modulus E.

The moment of inertia I of the balance wheel is a function of its radius r, and its mass M (which remains constant), and is expressed:

$$I = M \cdot r^2 \quad [3]$$

E, the Young's modulus coefficient, changes with variations in temperature and magnetic influence.

Where a non-magnetically sensitive and thermally stable balance spring, e.g. such as that disclosed in the inventor's PCT/GB03/003000, has been selected with a linear thermoelastic evolution in the operating temperature range (0-40° C.), the thermally induced changes remaining to be resolved reside in the balance wheel.

This is only possible if the correct material choice is made for the balance wheel, and a correct understanding of its kinetic performance, and its static and dynamic poising and adjustment are understood and allowed for in its manufacture and regulating once in the timekeeper.

The variables within the equation which are affected by temperature changes which must now be brought into constant relation can be simplified and represented in the following expression:

$$r/\sqrt{E} \text{ or } r^2/E \quad [4]$$

r is the radius of gyration of the balance wheel, and E is the Young's modulus of the spring.

The expression for the relationship between radius of gyration of the wheel and Young's modulus of the spring of materials used so far in the mechanical oscillator system is as expressed in [4].

These terms are not in a linear relationship, however it is necessary that this relationship should be constant (so as to keep the period T of oscillations isochronous).

The residual compensation that the balance must achieve must be calculated as a function of the thermal expansion or contraction of r since the mass is unaffected by changes in temperature and the moment of inertia is the product of $M \cdot r^2$ expressed in [3].

Historically, metal balance spring alloys have had a non-linear modulation of their thermoelastic modulus (the change in the Young's modulus with a temperature change is described by the curve $\sqrt{E}$). As balance wheels made of a single metal have a linear increase in their value of r over a rise in temperature, the superimposed curves of the evolution of r and $\sqrt{E}$ with temperature plotted on the same graph show an intersection at two points where the values of $\delta E$ provide a solution to the value of $\delta r$, or where the curved line of the graphed values of $\sqrt{E}$ intersects the straight line r. The discrepancy between the two curves at their widest separation is known as middle temperature error 2 as shown in the graph of FIG. 1.

The balance wheels and balance springs in the past capable of resolving this problem have been made of magnetically sensitive materials and due to current levels of magnetic pollution, are no longer suitable.

To provide a solution to the relation $$\frac{r}{\sqrt{E}},$$

first a spring with a linear thermoelastic evolution is required, where the characteristics of the spring allow a constant evolution so that the relationship tends towards r/E, and where the α coefficient of axial expansion of the spring for a rise in temperature is negative.

In order to improve the performance of the system having made the correct choice of spring, such as the inventor has devised (and methods of manufacture of which are discussed in the claims and later description), the choice of materials for the balance wheel must be from those insensitive to magnetism, most preferably of low α coefficient, and if not of the same sign then of very low α coefficient of opposite sign to the axial α coefficient of the spring material, which should preferably be of linear and low thermoelastic modulus tendency <1% between 0 and 80° C., as shown in the upper portion 3 of the graph of FIG. 2 where temperature is on the x-axis and nominal units of length and modulus of elasticity on the y-axis; the solid line represents evolution of r with temperature, the dashed line evolution of E with temperature.

Most preferably the balance wheel material should be of α coefficient of the same sign as the thermoelastic modulus tendency of the spring.

The α coefficients and the expansion characteristics whether isotropic or anisotropic, and the Young's modulus must all be calculated and considered carefully in the relationship [2]. If any of the variables are ignored, or the manner in which they are implicated in the system in motion, is done so without reference to, and understanding of, the other variables and their inter-relationship, no improved performance will be gained.

In general, the formula for timekeeping changes (U) consequent upon a rise in temperature of 1° C. is $$U = \alpha_1 - 3\alpha_2/2 - \delta E/2E \quad [5]$$

Thus U can be made to tend to zero when suitable values of $\alpha_1$ the balance coefficient of thermal expansion, and $\alpha_2$ the balance spring coefficient of thermal expansion, and the thermoelastic coefficient E are selected by careful choice of appropriate materials.

For a selected balance spring material where the thermoelastic modulus varies in a linear manner in the ambient range and is minimal, and where the spring requires the balance for its part to compensate in a residual manner in a positive or negative sense, the following solutions are proposed.

A first aspect of the present invention provides a method of making a balance spring for use in a horological or other precision instrument, comprising the steps of winding a length of non-magnetic balance spring material formed of continuous fibers or of a ceramic, around a cylindrical former, using a releasing agent to inhibit adjacent layers of the winding from adhering to each other or to facilitate release from each other should they become adhered, and heat treating the wound balance spring material.

A second aspect of the present invention provides a method of making a balance spring for use in a horological or other precision instrument, comprising the steps of placing a length of a non-magnetic balance spring material around, in or onto a receiving plate, former or mandrel, heat treating the balance spring material and removing it from the former, receiving plate or mandrel to form a flat Archimedes balance spring.

A third aspect of the present invention provides a non-magnetic balance wheel for use in a mechanical oscillator system for a horological or other precision instrument, the balance wheel including components of two different materials having different coefficients of thermal expansion arranged such that the moment of inertia of the balance wheel decreases with increasing temperature.

The third aspect may take the form of the fourth aspect of the present invention which provides balance wheel for use in a horological or other precision instrument, the balance wheel comprising:

a balance wheel arm having one or more cross-members formed of a first non-magnetic material having a first coefficient of thermal expansion which is positive; and a rim attached to said balance wheel arm, the rim being formed of a second non-magnetic material having a second coefficient of thermal expansion;

wherein said second coefficient of thermal expansion is less than said first coefficient of thermal expansion, such that an increase in temperature causes an increase in the cross member(s) length and radially inward deflection of the rim resulting in a decrease in the moment of inertia of the balance wheel.

The third aspect of the present invention may take the form of the fifth aspect of the present invention which provides a balance wheel for use in a horological or other precision instrument comprising:

a balance wheel arm having one or more cross-members formed of a first non-magnetically sensitive material having a first coefficient of thermal expansion;

a plurality of concave segments formed of a second non magnetically sensitive material having a second coefficient of thermal expansion which is positive; and wherein said second coefficient of thermal expansion is greater than said first coefficient of thermal expansion, such that with an increase in temperature said concave segments extend further radially inward causing a reduction in the moment of inertia of the balance wheel.

A sixth aspect of the present invention provides a mechanical oscillator system for use in a horological mechanism or other precision instrument, the system comprising a non-magnetic balance spring of flat spiral or helecoidal form and a non-magnetic balance wheel; the balance spring being formed of a ceramic material or a material comprising continuous fibers; the balance wheel being formed of a material having a coefficient of thermal expansion of less that $6 \times 10^{-6} K^{-1}$; the balance wheel further comprising a plurality of non-magnetic poising or timing appendages for making adjustments to the moment of inertia of the balance wheel.

A seventh aspect of the present invention provides A balance wheel assembly for use in a mechanical oscillator system for a horological or other precision instrument, comprising an integral balance staff and balance wheel integrally formed from an isotropic non-magnetic material having a thermal coefficient of expansion less than $6 \times 10^{-6} K^{-1}$.

An eighth aspect of the present invention provides an assembly for use in a mechanical oscillator system for a horological or other precision instrument comprising a balance staff and integrally formed with the balance staff one or more cross members for supporting a balance wheel rim, the cross members and balance staff being formed of a non-magnetic material having a thermal coefficient of expansion less than $6 \times 10^{-6} K^{-1}$.

A ninth aspect of the present invention provides A method of forming an assembly according to the eight aspect of the present invention by attaching the balance rim to the cross member(s) when both are in their green state, by bonding or heat treating.

A tenth aspect of the present invention provides a method of forming a balance wheel assembly for use in a horological or other precision mechanism, comprising attaching a separate ceramic staff and balance wheel together when they are in their green state and using a bonding or heat treatment process to secure them together; the balance wheel and balance staff being non-magnetic and having a coefficient of thermal expansion less than $6 \times 10^{-6} K^{-1}$.

Further aspects and preferred features of the present invention can be found in the following description and claims.

BRIEF DESCRIPTION OF THE DRAWINGS

Embodiments and examples of the present invention will now be described, by way of example only, with reference to the accompanying drawings, in which:

FIG. 3a is a top down view of a balance wheel according to a first embodiment of the present invention having different cross arm and rim materials;

FIG. 3b is a side view of the balance wheel of FIG. 3a;

FIG. 4b is a side view of the balance wheel of FIG. 4a;

FIG. 6b is a side cross-sectional view of the appendage and eccentric timing screw of FIG. 6a;

FIG. 7b is a side view of the timing screw of FIG. 7a;

DETAILED DESCRIPTION

Various embodiments of the present invention relate to the balance wheel of a mechanical oscillator system composed of balance wheel and balance spring, wherein the balance wheel and/or balance spring are preferably composed wholly of, or a combination of non-magnetically sensitive and preferably but not exclusively low α coefficient materials ($<+6 \times 10^{-6} K^{-1}$) including, ceramic material preferably from the group; aluminium nitride, alumino-silicate glass, alumina silica boria, boron carbide, boron nitride, silica, silicon, silicon dioxide, silicon nitride, zirconia (stabilised), potassium alumina muscovite, aluminium oxide (including ruby and sapphire) or diamond or synthetically derived diamond or extruded or isostatically moulded graphite, or thermoset, thermoplastic polymer or monomer, glass, carbon, or glassy carbon. Alternatively the materials may be chosen from the group of non-magnetically sensitive intermetallic compounds. The chosen materials may be in the form of fibers or nanoparticles continuous or dispersed, in matrices of thermoset or thermoplastic polymer, ceramic, glass, carbon, or glassy carbon. Furthermore the materials may be in the form of powders or micropowders or microspheres which are hot pressed or reaction bonded, or tape casting material, which is preferably ceramic, in binders which may be of volatile, waterbased or polymeric substance. Furthermore the material may be a composite material composed of graphitic continuous carbon fiber or non-continuous carbon fiber, carbon nanofiber or tube, polymeric or ceramic fibers in matrices of thermoset or thermoplastic polymer, ceramic, glass, carbon, or glassy carbon.

In order that such variation as is imposed by the thermal influences upon the balance wheel should be kept to a minimum.

In the first instance it is proposed that the materials selection for the balance wheel should preferably be for a low $\alpha$ coefficient isotropic ceramic material for example fused quartz (silicon dioxide 96-99%), of a single phase crystalline or mixed phase crystalline and residual glass composition, which has an $\alpha$ coefficient of $<+1.0 \times 10^{-6} K^{-1}$. This ensures a limited evolution of r with temperature.

Figure 4A:
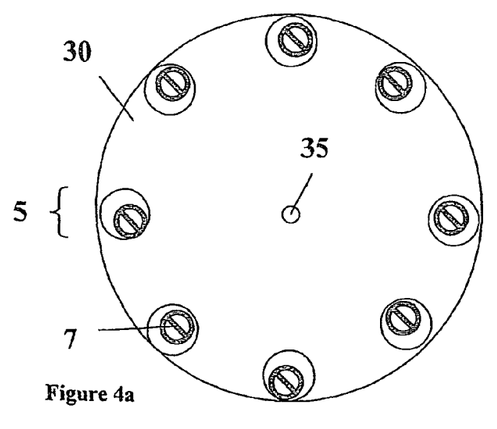
FIG. 4a is a top down view of a balance wheel according to a second embodiment of the present invention.
Figure 4B:
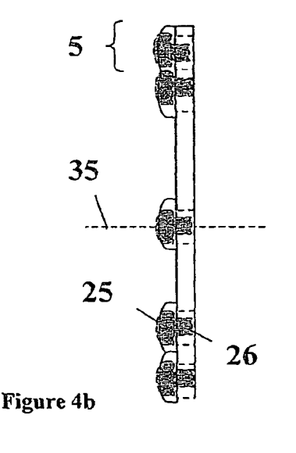

The balance wheel may preferably be circular and disc-like but is not limited to being circular. It may be formed with or without the additional mass of a perpendicular projecting shallow rim at the periphery. The upper surface plane which may preferably be circular and lower surface plane which may preferably be circular are parallel FIG. 4 shows an example of a planar disc-line balance wheel 30 having an aperture 35 for receiving a balance staff along its axis of rotation. Alternatively the balance wheel may be integral with the balance staff.

One aspect of the invention relates to a plain balance wheel or balance wheel and balance staff integrally fabricated of preferably one isotropic material composition with, a low +$\alpha$ coefficient and incorporating poising and timing appendages integrated in the balance weights.

The balance wheel should preferably be disposed of identical appendages 5 circumferentially fixed at the same radius from the central axis of rotation 35 of the balance wheel 30, at equal circumferential distance apart, the appendages 5 to number no less than two, and up to as many as may form a continuous ring of equally spaced such appendages arranged close to the rim of the balance wheel. Each appendage 5 is so placed and so shaped as to allow for an equal distribution of its mass with an increase in temperature, from its centre point, and most preferably equally and in the circular plane of the appendage which is parallel with the plane of rotation of the balance wheel.

The appendages 5 are composed of material of the same or greater density than the balance wheel itself, and allow for the moment of inertia of the balance wheel 30 represented by M·r, to be determined and also for the static and dynamic poising of the balance wheel as is known in the preparation of precision watches and other instruments.

As such the appendages 5 may be of metal or non-metal non-magnetically sensitive material which allow for the usual punctual removal of small amounts of the material for the purposes of the static poising of the balance wheel as is known in the art of regulating precision timekeepers.

Figures 3A, 3B:
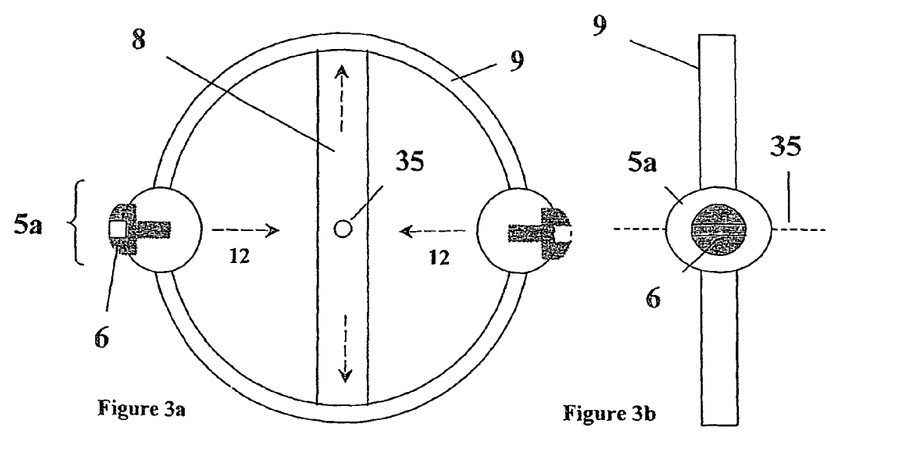
Figure 5:
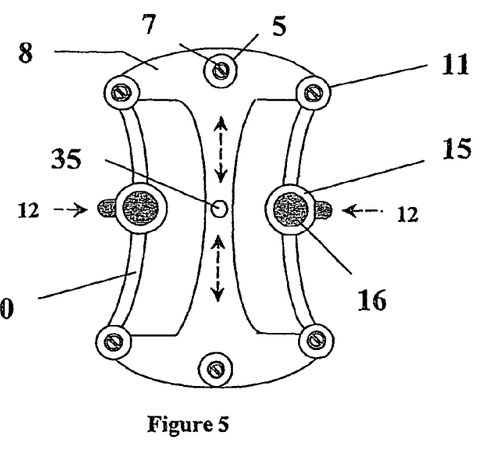
FIG. 5 is a top down view of the balance wheel according to the third embodiment of the present invention having inverted concave segments attached to the cross-member.
Figure 6A:
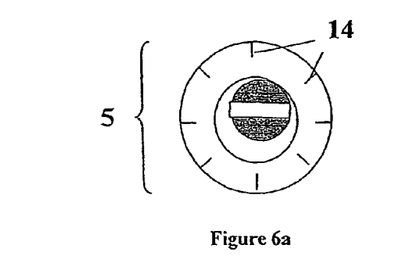
FIG. 6a is a top down view of an eccentric timing screw in a mass appendage.
Figure 6B:
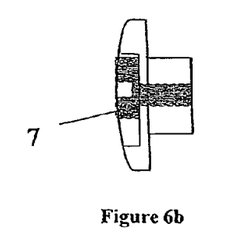

FIGS. 3 and 5 show examples of other forms of balance wheel which may have appendages similar to those in FIG. 4, but may (additionally or alternatively) have their own slightly different appendages 15, 16 and 5a, 6. These balance wheels are discussed in more detail later.

Furthermore the appendages 5, 5a are furnished with the ability to increase or reduce the product of M·r by reducing or increasing the effective radius of the centre of mass of part of or all the appendage in relation to the central axis 35 of rotation of the balance wheel 30. This feature is required in adjusting the frequency of the balance for a 'free-sprung' oscillator system (a system not requiring curb pins to control the length of the spring and thus the frequency of the balance wheel period).

This may be performed by timing screws 6, 7 mounted radially in the balance rim. Timing screws 6 or timing weights and/or screw assemblies or eccentric weights or screws 7 are preferably incorporated into the individual appendage assembly. These may be situated in the axis either parallel to (as in FIG. 4a) or perpendicular to (as in FIG. 3a) or both parallel and perpendicular to (FIG. 5) the balance staff axis and are fixed either close to the edge of the plain balance wheel, or on the rim of the balance wheel, or on the crossmember and rim of whatever configuration. Appendages 5 with rotatable timing screws or adjustment members parallel to the axis of rotation of the balance wheel having eccentric heads 25 on their rotatable stems 26. Adjustment members (e.g. timing screws) 6 perpendicular to the axis of rotation are non-eccentric.

The appendages and timing screw heads are so formed as to be of aero-dynamic profile so as to reduce the drag coefficient.

A balance wheel such as that shown in FIG. 4a can compensate for the effect of a low linear positive evolution of the thermoelastic modulus (E).

In the second instance where the balance spring is of 'normal' (–E), negative thermoelastic tendency, which is linear, then to resolve temperature error it is expedient to have a product of M·r which decreases with a rise in temperature. The effect of reduced elasticity of the balance spring will be compensated by a reduction in the moment of inertia, and T (the period of oscillation of the balance wheel) will remain unaffected.

This may preferably be achieved in two ways. The first of these is in the use of a combination materials for the balance wheel wherein a single or multiple membered sufficiently rigid balance wheel arm is made from a non magnetic material with +$\alpha$ thermal coefficient available from the appropriate materials previously listed, such that for an increase in temperature the cross member or members 8 (at the balance wheel arm) will extend. Their length will increase causing the less rigid balance rim 9 to deflect inwards. The reference numerals refer to FIG. 3a which shows an example of such a balance wheel. There is just one cross member in the example of FIG. 8 although there could in principle be more.

The balance wheel rim 9 is attached to the cross member or members 8 at equally spaced intervals and is preferably composed of a non-magnetic sufficiently flexible material with a lower linear thermal coefficient. Preferably the lower linear thermal coefficient is negative, most preferably of greater magnitude than the positive (+$\alpha$) linear thermal coefficient of the cross member or members, and available in the materials previously listed and including continuous carbon fiber, polyaramid fiber and liquid crystal polyester or polyester/amide copolymer. Therefore for an increase in temperature the circumference of the balance wheel rim 9 will decrease and being sufficiently flexible permit the inwards deflection of the balance wheel rim at the midway point 12 between its attachment to the cross member 8. In this example the appendages 5a, 15, 16 are at the midway point 12, although they could be at any other point on the rim, providing equipoise is achieved.

FIG. 5 gives an example of how the same effect may also be achieved by the use of a balance wheel cross member or members 8 of preferably negative (–$\alpha$) linear thermal coefficient and a balance wheel rim of positive (+$\alpha$) linear thermal coefficient of preferably greater magnitude composed of concave balance wheel rim segments 10 of 45°-180° of arc. The ends of the concave segments 10 of the rim are attached at equal radius from the centre of rotation 35, to the cross member or members 8 at location 11. The positive linear expansion of the rim segments 10 with a rise in temperature causes the centre of their arcs 12 to move toward the centre of rotation 35 as shown by the arrows in FIG. 5. The mass appendages 15, 16, fixed at the centre 12 of the inverted arc rim segments 10 are therefore carried towards the centre of rotation 35. If the cross member (s) have negative (−α) linear coefficient of thermal expansion they will contract with a rise in temperature. It would also be possible for them to have a low positive thermal coefficient (+α) less than the thermal coefficient of the concave rim segments, in which case they would expand, but by less then the rim segments which would consequently move radially inwards as described above. Further, it is not essential for the concave segments to form the rim, they could be provided as separate inserts. For example, it would be possible to have a circular rim of the same—or a different— material to the cross member(s) and two or more separate concave segments inside the rim, mounted to the cross member(s) and having a greater coefficient of thermal expansion than the cross members. For example plastics material concave inserts mounted inside the rim of a conventional brass balance wheel, the plastics material inserts preferably having non-magnetic timing weights attached thereto.

As a result of these last two configurations (examples of which are shown in FIGS. 3a and 5) the effective radius r will decrease and therefore the product of M·r will decrease. The mass appendages for poising and timing arranged in equipoise on the balance rim with a given product M·r at temperature X° C. move toward the centre of rotation simultaneously with a rise in temperature such that the product will become M(r−n) at X+n° C.

Adjusting the relative position and size and number of the appendages on the balance wheel rim will allow for the accurate determining of the evolution of the product M·r as the rate of change of radius is not the same at all points on the arcs or inverted arcs of the balance wheel rim between the points where they are attached to the balance wheel cross member.

Figure 2:
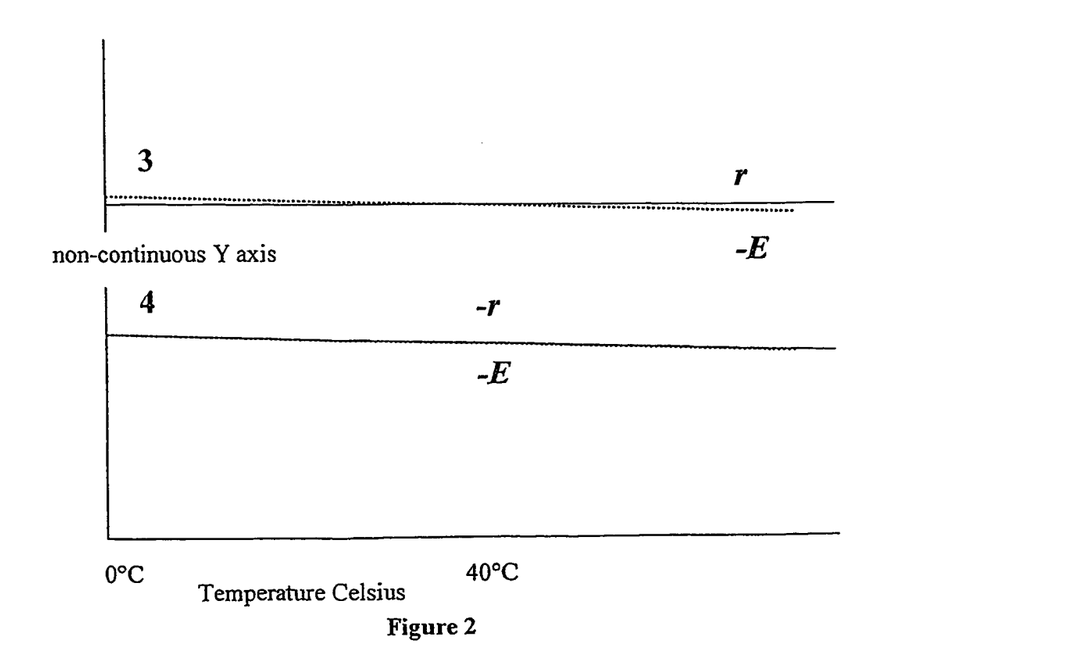
FIG. 2 is a graph showing variance of r and –E with temperature for embodiments of the present invention.

With a suitable choice and combination of chosen materials the mass M multiplied by the negative rate of change δr or positive δr in the case of the inverted curve rim, for a given rise in temperature annuls the effect of the negative tendency of the thermoelastic modulus of the balance spring and the residual temperature error is resolved as shown in line 4 in the lower portion of the graph of FIG. 2. The dashed line shows evolution of E with change in temperature, the solid line evolution of r.

Figure 7A:
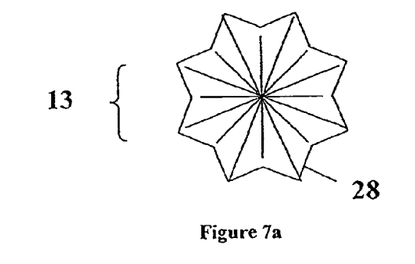
FIG. 7a is a top down view of a timing screw.
Figure 7B:
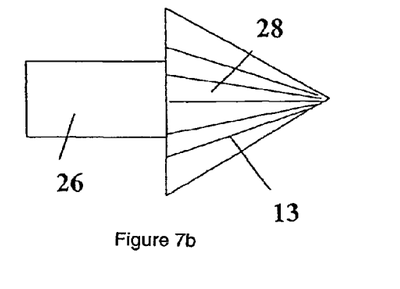

The timing screws oriented in the radial direction (perpendicular to the axis of rotation) may be so shaped as to facilitate the engagement and disengagement of a specially shaped tool for the purpose of the precision adjusting the M·r product. Specifically the timing screws, as shown in FIGS. 7a and 7b comprise a stem 26 and a head 28. The head 28, shown on side on in FIG. 7b together with the stem and top down (with stem hidden from view) in FIG. 7a tapers towards the top (remote from the stem) and has a plurality of splines 13 for engaging a spanner type turning tool. Preferably the timing screw head is conical in shape and may or may not taper to a point. This technique may also be applied to the parallel timing screws 7.

The timing screw appendages 5 may be disposed of indexes 14 to enable the accurate determination of the relative position of the timing screw 7.

The fixing together of the balance rim and balance wheel cross member or members made of different materials may preferably be integrally accomplished by use of the appendage assembly 5 which may serve as both timing and poising appendages and fastening agents of the two material elements to be joined. An example is shown in FIG. 5 where some of the appendages 5 are at location 11 joining the rim segments 10 with the cross member 8, but it could also be applied to the balance wheel of FIG. 3.

The Balance wheel rim may be moulded and integrate complete appendage masses 5, or seatings or settings 15 for the insertion of the appendage mass, whereupon the introduction of the radial timing screw 6 through the seating or setting wall, makes captive the appendage mass 16.

Regarding the configuration of the balance wheel assembly, examples are shown in FIGS. 8a to 8d.

Figure 8A:
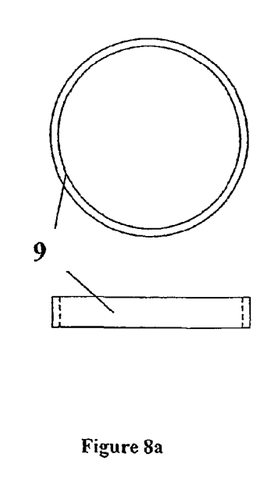
FIG. 8a is a top down view and side view of ring components of the balance wheel.
Figure 8B:
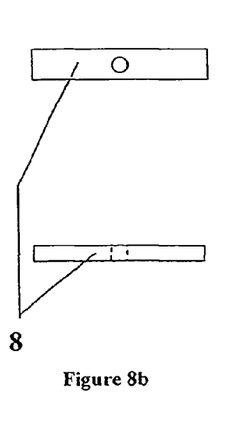
FIG. 8b shows top down and side views of a balance wheel cross member.
Figures 8C, 8D:
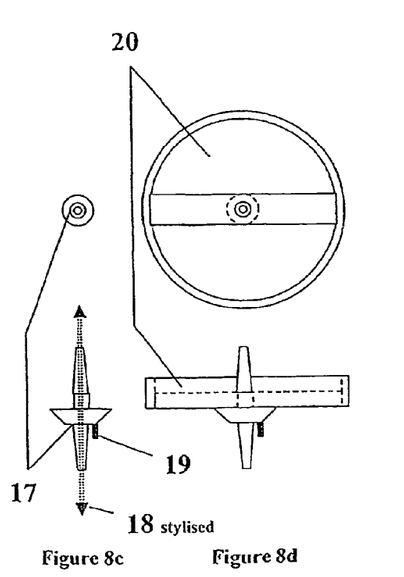
FIG. 8c is a top down and side view of a balance staff.
FIG. 8d shows top down and side views of an integral balance wheel and balance staff.

The balance wheel 8, 9 may be made separately from the balance staff 17 as in FIGS. 8a to 8c. Alternatively, the balance wheel may be made integrally as one piece with the balance staff 20 which itself may be made integrally with the impulse pin 19 as in FIG. 8d. The whole may be made in its entirety, or be made integrally with the balance staff 17 allowing for a different material core 18 (as shown in FIG. 8c) of similar diameter to the balance pivots to pass through and be fastened in the central axis of rotation or to be integrated and fastened into the upper and lowermost ends of the balance staff to act as high performance friction relieving pivots made of steel, tungsten, ceramic, composite, diamond especially when used in conjunction with the most suitable chosen friction relieving bearing surfaces made of steel, tungsten, ceramic, diamond, teflon or composite.

The balance is preferably made of a moulded suitable composite or ceramic or ceramic feedstock material or ceramic tape casting material or ceramic powder or micropowder, which in their green state (non fused state in which they are plastically deformable and not fully hardened) allows for the integration and fixing of a separate balance staff of another material 18, or is made from a one-piece moulding of the balance wheel and cross member and the balance staff together 20, or the integral moulding of the balance wheel crossmember and staff together, upon which is fixed the balance rim of another material or the same material of different phase or texture.

The balance spring of flat Archimedes form or helicoid form, both forms preferably integrating terminal curves as are known in the art, may preferably be made of ceramic or ceramic composite material.

Figure 9:
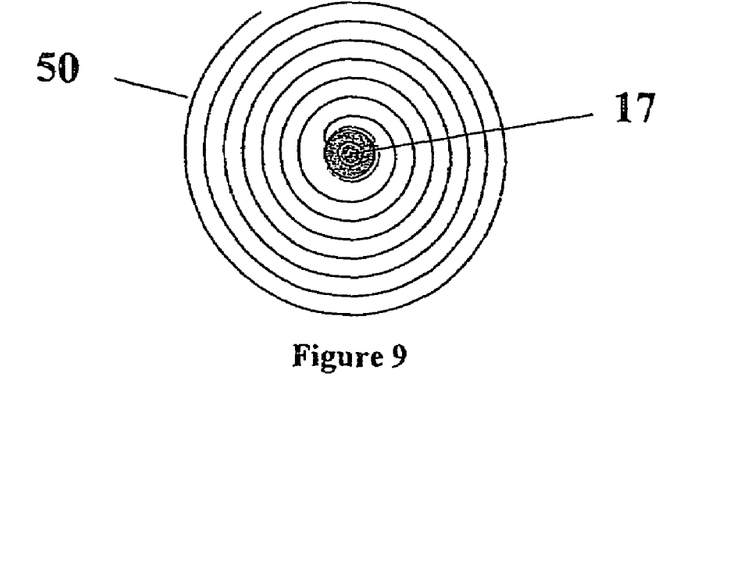
FIG. 9 is a top down plan view of an integral balance staff and balance spring.

In the case of the same or different materials it is expedient for the balance staff and balance spring to be integrally moulded and pyrolised, sintered or partially sintered, carbonised or cured, in a controlled manner prior to being fitted to the balance wheel. Further heat treatment or curing by heat or electron or x-ray, ultra-violet or microwave or laser beam may preferably take place for either or both the assembly of the components, or the adjusting of their thermal and or elastic characteristics. FIG. 9 shows an assembly comprising an integrally formed balance spring 50 and balance staff 17 in plan view from above.

Where the ceramic balance staff, spring and cross member are made as one, then the balance wheel material rim is later fixed in place by compatible means.

In the case where two different ceramics are used they are preferably precision moulded from 'high volume ceramic' preparation, heat treated by pyrolisis or sintered or carbonised or a combination of these and assembled for further heat treatment or the two elements united in the green state and preferably receive full or partial heat treatment together in the assembled state. The precision moulding of the ceramic preparation preferably requires high pressure injection and or compression and or uniaxial, isostatic or hydrostatic pressing with or without heat, or is reaction bonded.

The oscillator system composed of balance wheel, balance staff and balance spring of the same or different preferably ceramic materials, may be assembled after ambient temperature hardening of volatile binding agents preferably prior to heat treatment such that the separate elements are bonded in their correct relative relationship in the chosen heat treatment process. So a ceramic balance staff may be fixed to a ceramic balance spring or other material balance spring at this stage by the appropriate bonding means.

Figure 10:
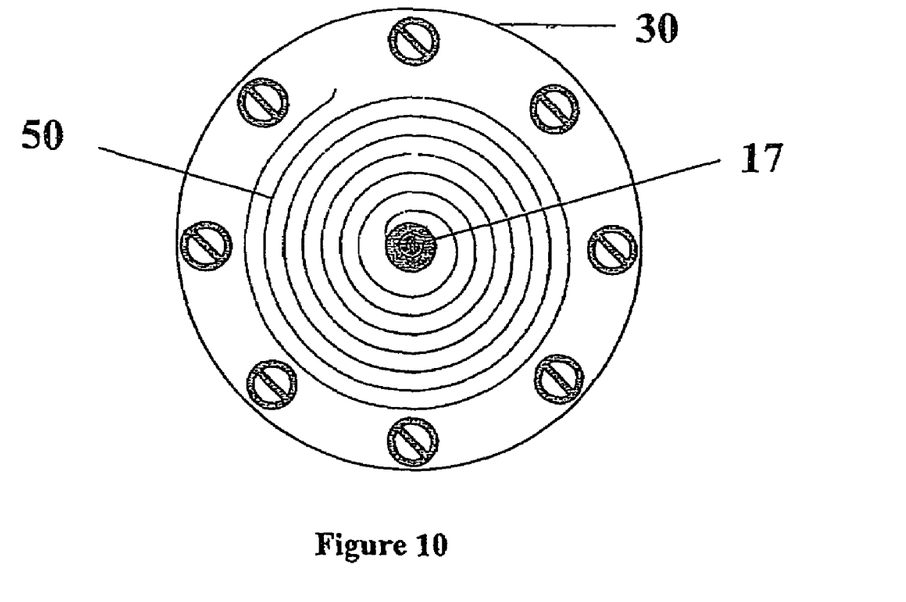
FIG. 10 shows a mechanical oscillator system comprising a balance spring, balance staff and balance wheel.
Figure 11A:
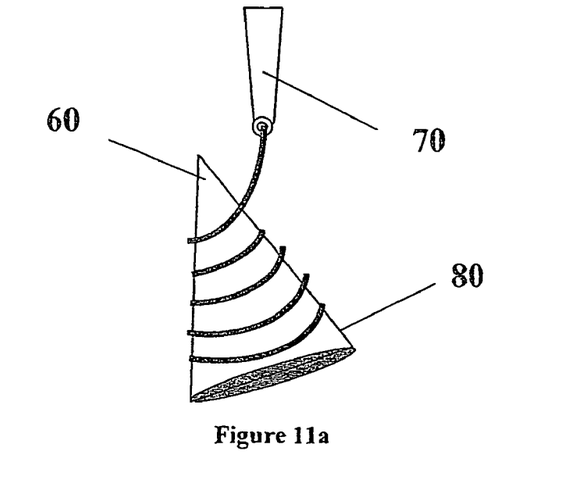
FIG. 11a shows a first method of making a balance spring with a conical former.

FIG. 10 shows an example of a mechanical oscillator system having a balance wheel 30 similar to that shown in FIG. 4 together with a balance staff 17 and balance spring 50.

Where the ceramic balance spring is made separately by precision extrusion it is expedient that the cross head or heads, and extruder nozzles or dies preferably but not exclusively allowing for round, square, rectangular or oval cross-section of the extruded material, should be in the vertical direction allowing downward flow of the material onto the receiving plate, die or former or mandrel which is enabled preferably to describe a spiral and terminal curve form such that the extruded material is laid onto or into the receiving plate or former or mandrel and is obliged to adopt the said form. FIG. 11a shows extrusion of spring material 60 from a nozzle 70 onto a rotating conical mandrel 80 so as to form a spiral.

Where the extruded material is wound onto a conical channelled or non-channelled heated mandrel it is expedient that partial curing or hardening of the material should take place before its release and the forming of such terminal curve as may be required.

Where the ceramic spring is made by the micro tape-casting process, the ceramic material is preferably laid into or wound onto a stationary or rotating mandrel former or die, preferably partially cured or heat treated, and then further shaped to acquire its final form and then fully cured or heat treated.

Where the balance rim or the spring is made from continuous fibers the preferred method of fabrication is by pultrusion of rovings or tow of 'Pre-preg' (continuous fiber material pre-impregnated with a matrix phase) which is preferably partially cured as it passes through a heated die of any cross-section before being mandrel wound or laid or wound into or onto a former.

Figure 11B:
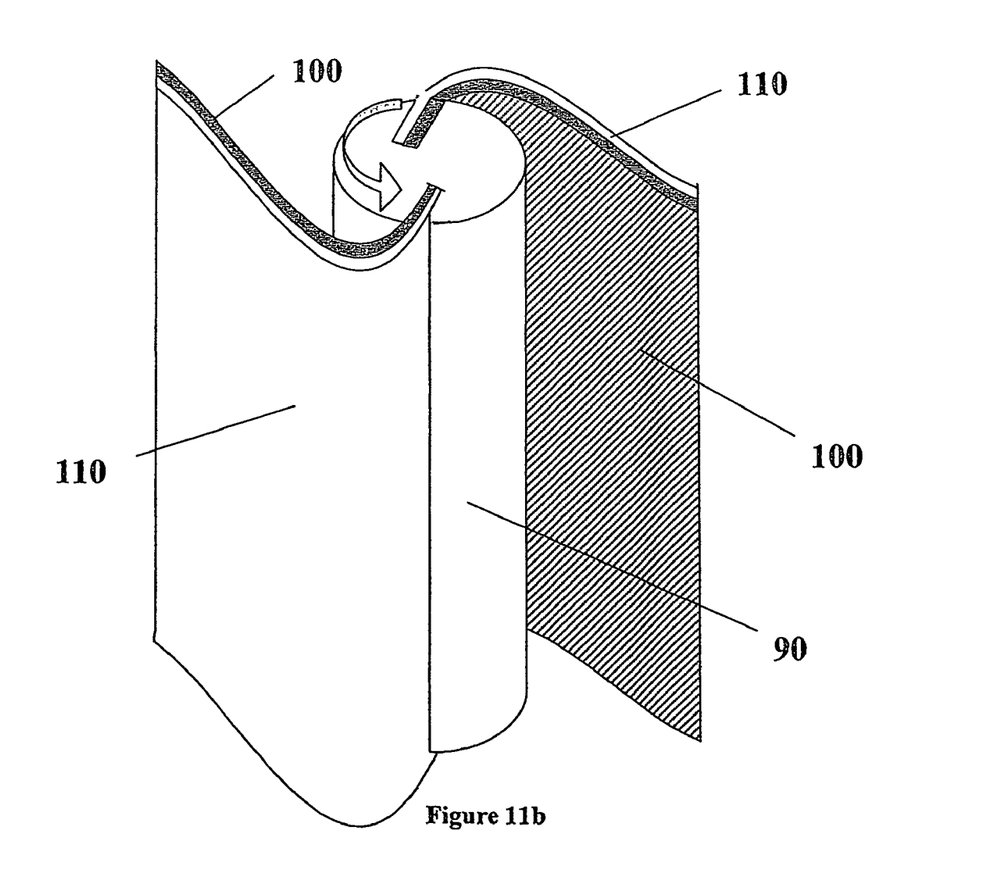
FIG. 11b shows a second method of making a balance spring with a cylindrical former and inter spacing layers.

It is preferable that such releasing agent as is necessary such as PTFE (Polytetraflouroethylene), FEP (Flourinated Ethylene Propylene Copolymer) or ETFE (Ethylene-Tetraflouroethylene Copolymer) in solid material or vapourised particle form is applied to the mandrels or formers for the expedient release or separation of the components or parts of the components during the fabrication process.

Where the fabrication of the continuous fiber balance rim or continuous fiber balance spring or the ceramic fiber or plain ceramic rim or ceramic spring is accomplished by the winding of preferably 'Pre-preg' or tape casting material sheet around a cylindrical former with or without the use of an interlayer releasing agent spacing sheet, it is preferable after full or partial curing or heat treatment that the so formed cylindrically shaped roll composed of as many continuously rolled layers as may be required by winding of a continuous sheet of the chosen material around the cylindrical mandrel is subsequently sliced at intervals in the axis perpendicular to the cylinder's rotational axis, thus producing rims or spirals. FIG. 11b shows a cylindrical mandrel 90 at the beginning of the process before the lengths of spring material 100 and spacing sheet material 110 have been wound around the mandrel. Although in FIG. 11b there are two spacing material sheets 110 and two spring material sheets 100, there could only be one of each or three or more of each.

The method of cutting may preferably be by mechanical, electrical or chemical means, or by beam treatment means, of any wavelength of the spectrum, including cooled non-$CO_2$ laser cutting techniques and processes.

Figure 12:
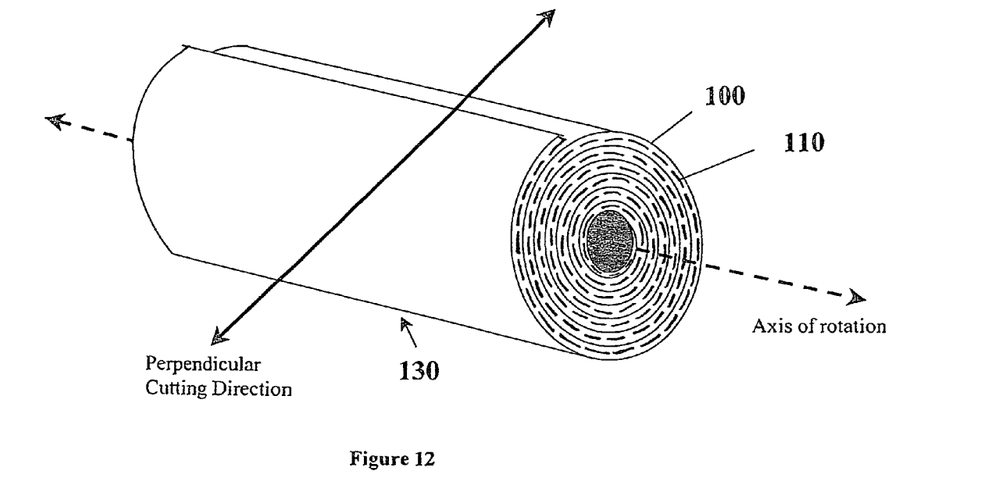
FIG. 12 illustrates the direction of cutting of a composite roll of balance spring and spacing materials formed by the method of FIG. 11b.

FIG. 12 shows the wound assembly 130 of spacing material and balance spring sheets 100, 110 with the spacing material, illustrated as a dashed line. The axis of rotation of the mandrel and direction of cutting are also shown.

Figure 13:
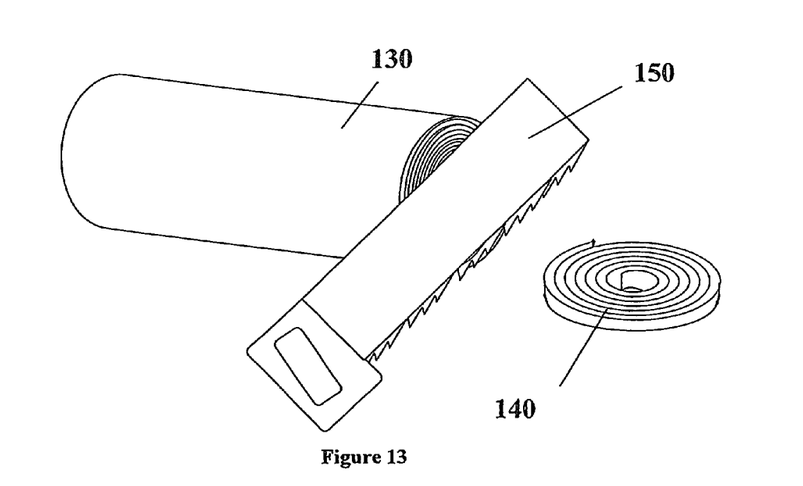
FIG. 13 illustrates cutting the assembly of FIG. 12 to form a plurality of spiral springs.

FIG. 13 illustrates how cutting 130 wound assembly 130 can give a plurality of balance springs 140. A saw is shown as a nominal mechanical cutting device 150, but other methods could be used as discussed above.

The interspacing material which is employed for the separation of the successive layers of the multi-layered roll may preferably be removed by heat, mechanical, electrical or chemical treatment or by beam treatment means, of any wavelength of the spectrum.

The invention claimed is:

1. A thermally compensating non-magnetic balance wheel for use in conjunction with a thermally stable non-magnetic balance spring in a mechanical oscillator system in a horological or other precision instrument, the balance wheel comprising:

components of two different non-magnetic materials having different thermal expansion coefficients, the components including a balance arm attached to a balance rim, the balance arm having a thermal expansion coefficient that is less than $6 \times 10^{-6} K^{-1}$ and the balance rim having a thermal expansion coefficient different from the thermal expansion coefficient of the balance arm, the components being arranged to give equipoise to the balance wheel and to cause a decrease in the moment of inertia of the balance wheel with an increase in temperature, wherein the decrease in the moment of inertia is arranged to compensate for changes in the elasticity of the balance spring caused by the increase in temperature.

2. A balance wheel according to claim 1, wherein the balance arm has one or more cross members and the balance rim is attached to or integral with said cross members.

3. A balance wheel according to claim 2, wherein the balance rim and cross member(s) are formed of a first material having a first coefficient of thermal expansion and the balance wheel further comprises two concave segments inside said rim, formed of a different material to said rim having a second coefficient of thermal expansion greater than said first coefficient of thermal expansion.

4. A balance wheel according to claim 2, wherein the balance rim is formed of a first material having a first coefficient of thermal expansion and two or more members formed of a second material having a second coefficient of thermal expansion greater than said first material are attached to said rim and extend inwardly therefrom.

5. A balance wheel according to claim 2, wherein the cross member(s) is of a first material having a first coefficient of thermal expansion and the rim is of a second material having a second coefficient of thermal expansion less than the first coefficient of thermal expansion, such that the increase in temperature causes an increase in the cross member(s) length and radially inward deflection of the rim to cause the decrease in the moment of inertia of the balance wheel.

6. A balance wheel according to claim 5, wherein there are at least two appendages to the rim in the form of non-magnetically sensitive timing weights.

7. A balance wheel according to claim 5, wherein said second coefficient of thermal expansion is negative.

8. A balance wheel according to claim 5, wherein there are one or more appendages arranged on the cross member(s), said appendage(s) comprising a stem and an eccentric head on the stem, the stem being rotatably mounted in an aperture of the balance wheel such that it is rotatable about an axis parallel to the axis of rotation of the balance wheel, whereby the moment of inertia of the balance wheel can be fine tuned by turning of the eccentric head.

9. A balance wheel according to claim 2, wherein the cross member(s) is of a first material having a first coefficient of thermal expansion and the rim comprises concave segments of a second material having a second coefficient of thermal expansion greater than said first coefficient of thermal expansion.

10. A balance wheel according to claim 9, wherein the second coefficient of thermal expansion is positive and greater than said first coefficient of thermal expansion, such that said concave segments are arranged to extend further radially inward with the increase in temperature to cause the decrease in the moment of inertia of the balance wheel.

11. A balance wheel according to claim 10, wherein there are a plurality of appendages to the concave segments in the form of non-magnetically sensitive timing weights.

12. A balance wheel according to claim 10, wherein said first coefficient of thermal expansion is negative, such that the cross member length(s) decreases with the increase in temperature to cause the decrease in the moment of inertia of the balance wheel.

13. A balance wheel assembly comprising:
a thermally compensating non-magnetic balance wheel for use in conjunction with a thermally stable non-magnetic balance spring in a mechanical oscillator system in a horological or other precision instrument, the balance wheel including components of two different non-magnetic materials having different coefficients of thermal expansion, the components including a balance arm attached to a balance rim, the balance arm having a thermal expansion coefficient that is less than $6\times 10^{-6} K^{-1}$ and the balance rim having a thermal expansion coefficient different from the thermal expansion coefficient of the balance arm, the components being arranged to give equipoise to the balance wheel and to cause a decrease in the moment of inertia of the balance wheel with an increase in temperature, wherein the decrease in the moment of inertia is arranged to compensate for changes in the elasticity of the balance spring caused by the increase in temperature; and
a balance staff formed integrally with the balance wheel.

14. A balance wheel assembly according to claim 13, wherein the balance wheel and balance staff are formed of a ceramic material.

15. A balance wheel assembly according to claim 13, wherein the balance staff is integrally formed with one or more cross members which are arranged to support the balance rim.

16. A method of forming a balance wheel assembly, the balance wheel assembly comprising:
a thermally compensating non-magnetic balance wheel for use in conjunction with a thermally stable non-magnetic balance spring in a mechanical oscillator system in a horological or other precision instrument, the balance wheel including components of two different non-magnetic materials having different materials having different coefficients of thermal expansion, the components including a balance arm attached to a balance rim, the balance arm having a thermal expansion coefficient that is less than $6\times 10^{-6} K^{-1}$ and the balance rim having a thermal expansion coefficient different from the thermal expansion coefficient of the balance arm, the components being arranged to give equipoise to the balance wheel and to cause a decrease in the moment of inertia of the balance wheel with an increase in temperature, wherein the decrease in the moment of inertia is arranged to compensate for changes in the elasticity of the balance spring caused by the increase in temperature; and
a balance staff formed integrally with the balance wheel;
the method comprising attaching the balance staff and balance wheel together when they are in their green state and using a bonding or heat treatment process to secure them together.

* * * * *